United States Patent
Sekita (10) Patent No.: US 10,193,344 B2
(45) Date of Patent: Jan. 29, 2019

(54) POWER STORAGE SYSTEM, POWER STORAGE MODULE, AND CONTROL METHOD

(71) Applicant: Murata Manufacturing Co., Ltd., Kyoto (JP)

(72) Inventor: Suguru Sekita, Tokyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 117 days.

(21) Appl. No.: 14/901,687

(22) PCT Filed: May 26, 2014

(86) PCT No.: PCT/JP2014/002736
§ 371 (c)(1),
(2) Date: Dec. 28, 2015

(87) PCT Pub. No.: WO2014/207994
PCT Pub. Date: Dec. 31, 2014

(65) Prior Publication Data
US 2016/0372928 A1 Dec. 22, 2016

(30) Foreign Application Priority Data
Jun. 28, 2013 (JP) .................... 2013-137180

(51) Int. Cl.
*H02J 3/38* (2006.01)
*H02J 7/00* (2006.01)
(Continued)

(52) U.S. Cl.
CPC .......... *H02J 3/383* (2013.01); *H02J 7/0031* (2013.01); *H02J 7/0063* (2013.01);
(Continued)

(58) Field of Classification Search
CPC .... H02J 3/38; H02J 3/381; H02J 3/382; H02J 3/383; H02J 3/385; H02J 7/0029;
(Continued)

(56) References Cited

U.S. PATENT DOCUMENTS

2008/0174926 A1 7/2008 Evan et al.
2013/0049696 A1 2/2013 Zhu et al.

FOREIGN PATENT DOCUMENTS

CN 101584096 A 11/2009
CN 101860066 A 10/2010
(Continued)

OTHER PUBLICATIONS

Office Action for CN Patent Application No. 201480035277.6, dated Aug. 25, 2017, 08 pages of Office Action and 08 pages of English Translation.
(Continued)

*Primary Examiner* — Lincoln D Donovan
*Assistant Examiner* — Diana J. Cheng
(74) *Attorney, Agent, or Firm* — Chip Law Group (57) ABSTRACT

[Solving Means] A power storage system includes, for example, a plurality of power storage modules connected in parallel to a power line and a system voltage acquisition unit that obtains a system voltage in the power line. The power storage module includes a power storage section formed of one or more storage batteries and a current control unit that controls a current that flows between the power storage section and the power line. The current control unit controls, according to the system voltage and a voltage of the power storage section, the current that flows between the power storage section and the power line.

10 Claims, 9 Drawing Sheets

(51) Int. Cl.
*H02J 7/34* (2006.01)
*H02M 7/06* (2006.01)
*H02M 7/44* (2006.01)
*H02J 7/35* (2006.01)
*H02J 9/06* (2006.01)

(52) U.S. Cl.
CPC .............. *H02J 7/0068* (2013.01); *H02J 7/34* (2013.01); *H02J 7/35* (2013.01); *H02J 9/062* (2013.01); *H02M 7/06* (2013.01); *H02M 7/44* (2013.01); *H02J 2007/0039* (2013.01); *Y02B 10/72* (2013.01); *Y02E 10/563* (2013.01); *Y02E 10/566* (2013.01)

(58) Field of Classification Search
CPC ...... H02J 7/0031; H02J 7/0032; H02J 7/0063; H02J 7/0065; H02J 7/0068; H02J 7/02; H02J 7/04; H02J 7/06; H02J 7/062; H02J 7/064; H02J 7/066; H02J 7/068; H02J 7/08; H02J 7/10; H02J 7/103; H02J 7/106; H02J 7/34; H02J 7/345; H02J 7/35; H02J 7/355; H02J 2007/0067; H02J 2007/0039
USPC ............................................... 307/18, 25–28
See application file for complete search history.

(56) References Cited

FOREIGN PATENT DOCUMENTS

| | | |
|---|---|---|
| EP | 2106630 A2 | 10/2009 |
| EP | 2751867 A1 | 7/2014 |
| JP | H09-284998 A | 10/1997 |
| JP | 2006-262565 A | 3/2005 |
| JP | 2006-262565 A | 9/2006 |
| JP | 5121850 B2 | 1/2013 |
| JP | 2014-030108 A | 2/2014 |
| JP | 2014-531703 A | 11/2014 |
| KR | 10-2009-0104827 A | 10/2009 |
| WO | 2008/088755 A2 | 7/2008 |
| WO | 2012/043723 A | 4/2012 |
| WO | 2012/043723 A1 | 4/2012 |
| WO | 2013/029467 A1 | 3/2013 |

OTHER PUBLICATIONS

Office Action for CN Patent Application No. 201480035277.6, dated Mar. 27, 2018, 07 pages of Office Action.
Office Action for CN Patent Application No. 201480035277.6, dated Sep. 20, 2018, 5 pages of Office Action.
Office Action for EP Patent Application No. 14817179.6, dated Sep. 24, 2018, 7 pages of Office Action.
Extended European Search Report of EP Patent Application No. 14817179.6, dated Jan. 18, 2017, 10 pages.
Chen, et al., "A Hot-Swap Solution for Paralleled Power Modules by Using Current-Sharing Interface Circuits", IEEE Transactions on Power Electronics, vol. 21, Issue 6, Nov. 2006, pp. 1564-1571.

POWER STORAGE SYSTEM, POWER STORAGE MODULE, AND CONTROL METHOD

TECHNICAL FIELD

The present technology relates to a power storage system, a power storage module, and a control method.

BACKGROUND ART

A technique relating to so-called hot swapping, for example, exchanging, removing, or adding units that constitute a system during operation of the system is known. However, a large current (rush current) may flow through the system when the units are connected during operation of the system and the system may be damaged. Therefore, reducing the rush current has been proposed (e.g., see Patent Document 1 below).

Patent Document 1: Japanese Patent Application Laid-open No. HEI09-284998

SUMMARY OF INVENTION

Problem to be Solved by the Invention

The technique of Patent Document 1 does not use a battery as a power supply. Also in a system using the battery as the power supply, it is desirable to reduce the rush current.

Therefore, it is an object of the present technology to provide a power storage system, a power storage module, and a control method, by which the above-mentioned point can be solved.

Means for Solving the Problem

In order to solve the above-mentioned problems, the present technology is, for example, a power storage system, including:

a plurality of power storage modules that are connected in parallel to a power line; and a system voltage acquisition unit that obtains a system voltage in the power line, the power storage module including a power storage section that is formed of one or more storage batteries, and a current control unit that controls a current that flows between the power storage section and the power line, the current control unit controlling, according to the system voltage and a voltage of the power storage section, the current that flows between the power storage section and the power line.

The present technology is, for example, a power storage module that is connectable and disconnectable to/from a predetermined power line, including:

a power storage section that is formed of one or more storage batteries; and a current control unit that controls a current that flows between the power storage section and the power line, the current control unit controlling, according to a system voltage in the power line and a voltage of the power storage section, the current that flows between the power storage section and the power line.

The present technology is, for example, a control method for a power storage module, including:

obtaining a system voltage in a power line to/from which the power storage module is connectable and disconnectable; and controlling a current that flows between the power storage section and the power line according to the obtained system voltage and a voltage of a power storage section that is formed of one or more storage batteries.

Effects of the Invention

According to at least one embodiment, in the system using the battery as the power supply, control to reduce a rush current can be performed. Note that the effects described herein are merely examples and should not be understood as limiting the contents of the present technology. Furthermore, it does not deny that effects different from the exemplified effects can be obtained.

MODE(S) FOR CARRYING OUT THE INVENTION

Hereinafter, an embodiment and the like of the present technology will be described with reference to the drawings. Note that the descriptions will be made in the following order.

<1. Embodiment>
<2. Modified Example>
<3. Application Examples>

The embodiment and the like described hereinafter are favorable specific examples of the present technology and the contents of the present technology are not limited to those embodiment and the like.

1. Embodiment

Example of Configurations of General Power Storage System and Power Storage Module For easy understanding of the present technology, examples of general power storage system and power storage module will first be described.

Figure 1:
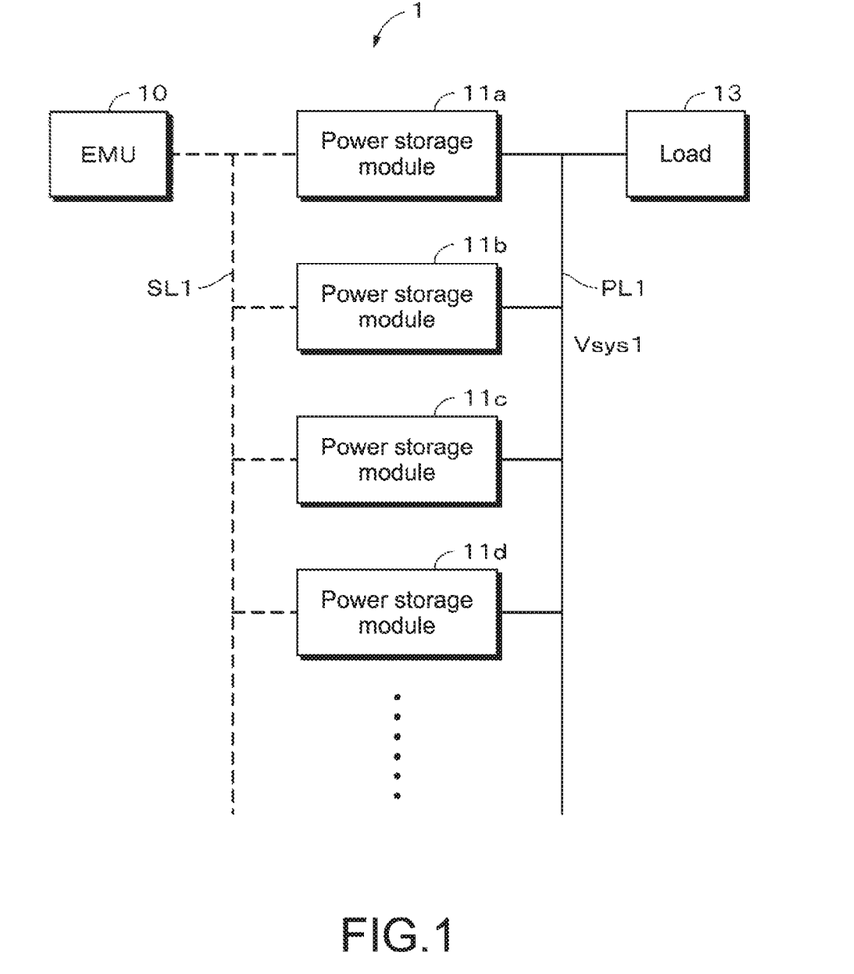
FIG. 1 A diagram for describing a configuration of a general power storage system.

FIG. 1 is a diagram for describing an example of the configuration of the general power storage system. A power storage system 1 includes an EMU (Energy Management Unit) 10 and a plurality of power storage modules. FIG. 1 shows a power storage module 11a, a power storage module 11b, a power storage module 11c, and a power storage module 11d as examples of the plurality of power storage modules. When it is not necessary to distinguish the power storage modules, they will be referred to as power storage modules 11.

The EMU 10 and the power storage modules 11 are connected to one other via a predetermined communication line SL1. Data and commands can be exchanged between the EMU 10 and the power storage modules 11 via the communication line SL1.

The plurality of power storage modules 11 are connected in parallel to a predetermined power line PL1. The power storage modules 11 are connected to a load 13 via the power line PL1. The contents of the load 13 can be set depending on purposes of the power storage system 1. During operation of the power storage system 1, a voltage Vsys1 is generated in the power line PL1.

Figure 2:
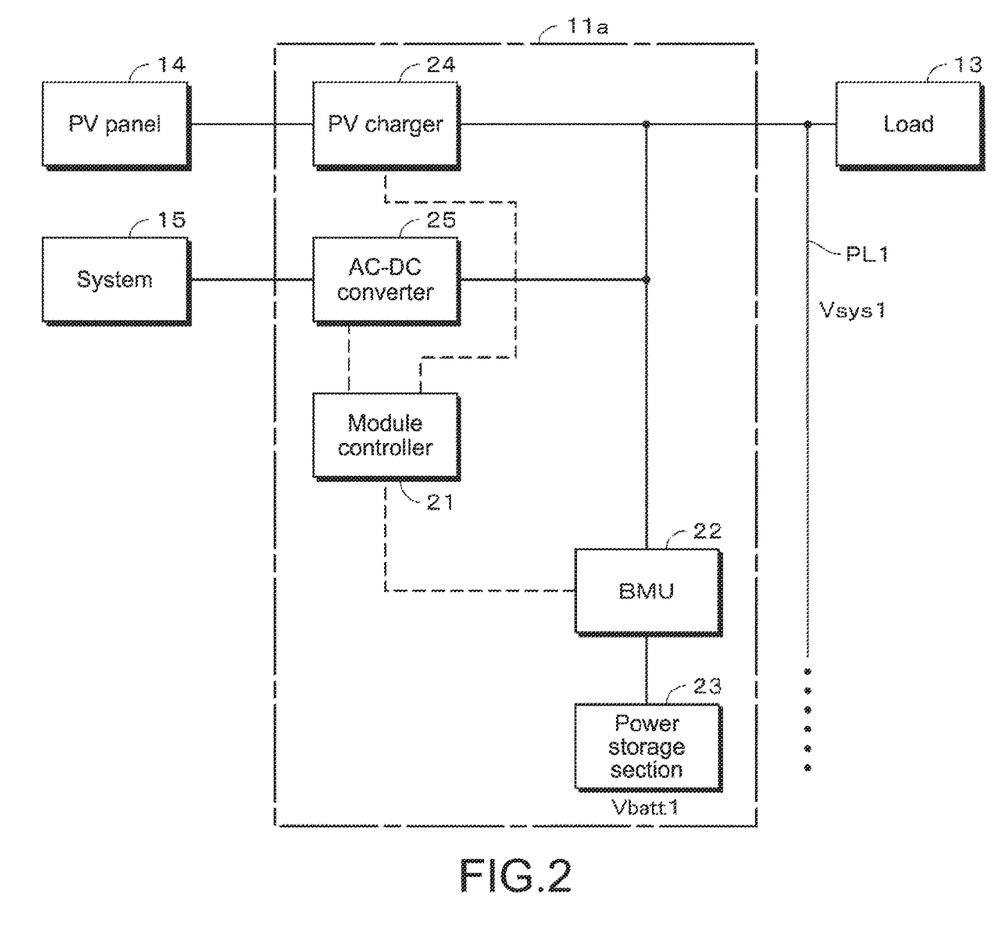
FIG. 2 A diagram for describing a configuration of a general power storage module.

FIG. 2 is a diagram for describing an example of a configuration of the general power storage module. FIG. 2 shows a power storage module 11a. Other power storage modules such as a power storage module 11b have the same configuration. Note that, in FIG. 2, paths for power are indicated by solid lines and paths for data and control commands are indicated by dotted lines.

The power storage module 11a includes, for example, a module controller 21, a BMU (Battery Management Unit) 22, a power storage section 23, a PV (Photovoltaic) charger 24, and an AC (Alternating Current)-DC (Direct Current) 25. The PV charger 24 is connected to a PV panel 14 outside the power storage module 11a. The AC-DC converter 25 is connected to a system power 15 outside the power storage module 11a. Note that configurations thereof will be specifically described when a configuration of the power storage module in the embodiment of the present technology is described.

The power storage modules 11 are connectable and disconnectable to/from the power line PL1. For example, during operation of the power storage system 1, the power storage module 11a of the plurality of power storage modules 11 can be disconnected from the power line PL1. For example, for maintenance such as checking and repairing the power storage module 11a, the power storage module 11a is disconnected from the power line PL1.

After the maintenance is completed, the power storage module 11a is connected to the power line PL1 again. In this connection, for example, if the voltage Vsys1 is higher than a voltage Vbatt1 of the power storage section 23 by a predetermined level or more, there is a fear that a rush current exceeding the rating of the power storage section 23 flows to the power storage section 23 through a power line between the power storage section 23 and the power line PL1. On the other hand, if the voltage Vbatt1 is higher than the voltage Vsys1 by a predetermined level or more, there is a fear that a rush current flows from the power storage section 23 to the load 13.

When the power storage module 11a is connected to the power line PL1, in order to prevent a rush current from flowing, it is necessary to consider a potential difference between the voltage Vsys1 and the voltage Vbatt1. Thus, there is a problem in that time and labor is needed for the connection work. In addition, there is also a problem in that a rush current may flow if the procedure for connecting the power storage module 11a to the power line PL1 is incorrect. Hereinafter, the embodiment of the present technology that has been made in view of such problems will be described.

Example of Power Storage Section

Preceding the description of the embodiment of the present technology, an example of a power storage section in the embodiment will be described. The power storage section is constituted of, for example, a plurality of secondary batteries. The secondary batteries constituting the power storage section are, for example, lithium-ion secondary batteries each containing a positive electrode active material and a carbon material such as graphite as a negative electrode active material. Although a positive electrode material is not particularly limited, it is favorably one containing a positive electrode active material having an olivine structure.

The positive electrode active material having the olivine structure is more favorably a lithium-iron phosphate compound ($LiFePO_4$) or favorably a lithium-iron-complex phosphate compound containing a heteroatom ($LiFe_xM_{1-x}O_4$: M indicates one or more kinds of metals, $0<x<1$). Here, the "main part" means one-half or more of a total mass of the positive electrode active material of a positive electrode active material layer. Furthermore, in the case where M is two or more kinds of metals, they are selected such that the sum of the subscripts equals 1−x.

Examples of M can include transition elements, IIA group elements, IIIA group elements, IIIB group elements, and IVB group elements. In particular, they favorably include at least one kind of cobalt (Co), nickel, manganese (Mn), iron, aluminum, vanadium (V), and titanium (Ti).

Regarding the positive electrode active material, a surface of the lithium-iron phosphate compound or the lithium-iron-complex phosphate compound may be coated with a coating layer including a metallic oxide having a composition different from that of this oxide (e.g., one selected from Ni, Mn, Li, and the like), a phosphate compound (e.g., lithium phosphate), or the like.

As the positive electrode material capable of occluding and discharging lithium (Li), a lithium composite oxide such as a lithium cobalt oxide ($LiCoO_2$) having a laminar rock salt structure, a lithium nickel oxide ($LiNiO_2$), a lithium manganate ($LiMnO_2$), and a lithium manganate ($LiMn_2O_4$) having a spinel structure may be used.

The graphite in the present technology is not particularly limited and graphite materials used in the art can be widely used. As the material of the negative electrode, a lithium titanate, a silicon (Si)-based material, a tin (Sn)-based material, or the like may be used.

The manufacturing method for the electrodes of the battery according to the present technology is not particularly limited and methods used in the art can be widely used.

The battery configuration in the present technology is not particularly limited, well-known configurations can be widely used.

An electrolyte used in the present technology is not particularly limited. Electrolytes that include liquid and gelatinous types and are used in the art can be widely used.

An electrolyte solvent is favorably 4-fluoro-1,3-dioxolan-2-one (FEC), ethylene carbonate, propylene carbonate, butylene carbonate, vinylene carbonate (VC), dimethyl carbonate, diethyl carbonate, ethyl methyl carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, ethyl propionate, acetonitrile, glutaronitrile, adiponitrile, methoxy acetonitrile, 3-methoxypropyl nitrile, N, N-dimethylformamide, N-methylpyrrolidinone, N-methyl-oxazolidinone, nitromethane, nitroethane, sulfolane, dimethyl sulfoxide, trimethyl phosphate, triethyl phosphate, ethylene sulfide, and bis(trifluoromethylsulfonyl)imide trimethylhexyl ammonium, more favorably 4-fluoro-1,3-dioxolan-2-one (FEC), ethylene carbonate, propylene carbonate, butylene carbonate, vinylene carbonate (VC), dimethyl carbonate, diethyl carbonate, ethyl methyl carbonate, γ-butyrolactone, a γ-valerolactone.

A supporting electrolyte salt is favorably lithium hexafluorophosphate ($LiPF_6$), bis (pentafluoroethanesulfonyl) imide lithium ($Li(C_2F_5SO_2)_2N$), lithium perchlorate ($LiClO_4$), lithium hexafluoroarsenate ($LiAsF_6$), lithium tetrafluoroborate ($LiBF_4$), lithium trifluoromethanesulfonate ($LiSO_3CF_3$), bis(trifluoromethanesulfonyl)imide lithium ($Li(CF_3SO_2)_2N$), or tris(trifluoromethanesulfonyl) methyl lithium ($LiC(SO_2CF_3)_3$).

The lithium-ion secondary batteries can be classified into a square type, a cylindrical type, and the like based on the shapes. In the present technology, as an example, a cylindrical lithium-ion secondary battery is used. The cylindrical lithium-ion secondary battery as the example of the storage battery will be sometimes referred to as a cell. An average output voltage of the lithium-ion secondary battery cell is, for example, about 3.0V (volts) and a full-charge voltage is, for example, about 4.2V. Furthermore, the capacity of the lithium-ion secondary battery cell is, for example, 3 Ah (ampere-hour) (3000 mAh (milliampere-hour)).

By connecting a plurality of cells, a sub-module is formed. The sub-module has a configuration in which, for example, eight cells are connected in parallel. The capacity of the sub-module in this case is about 24 Ah and the voltage is about 3.0V approximately equal to the voltage of the cell.

For example, by connecting sixteen sub-modules in series, a power storage section is configured. The capacity of the power storage section in this case is about 24 Ah and the voltage is about 48V (3.0V*16). One power storage module is formed by housing the power storage section together with other components in a common case.

Note that the configuration of the power storage section can be appropriately changed depending on purposes and the like. In addition, it is not limited to the lithium-ion secondary battery and the power storage section may be constituted of a secondary battery (sodium-sulfur battery, nickel metal hydride battery, or the like) other than the lithium-ion secondary battery, a capacitor (electrical double-layer capacitor or the like), or a combination thereof.

Figure 3:
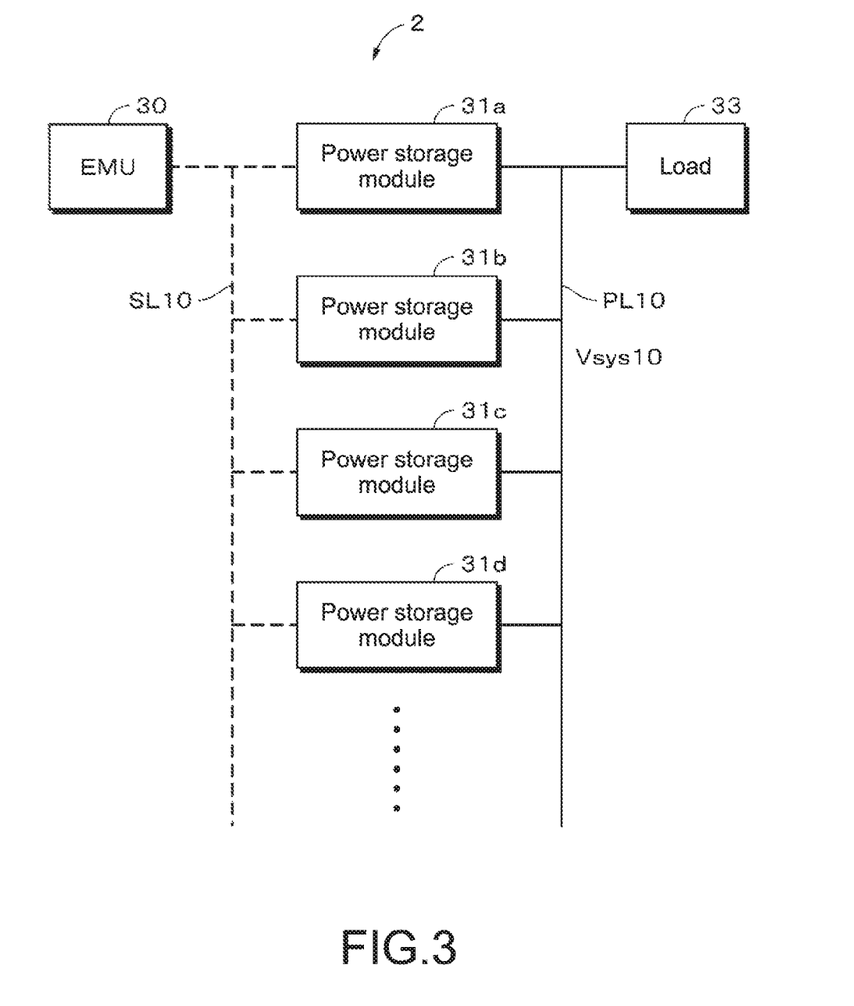
FIG. 3 A diagram for describing a configuration of a power storage system in an embodiment of the present technology.

Examples of Configurations of Power Storage System and Power Storage Module in Embodiment FIG. 3 is a diagram for describing an example of a configuration of a power storage system in the embodiment of the present technology. A power storage system 2 includes an EMU 30 and a plurality of power storage modules. FIG. 3 shows a power storage module 31a, a power storage module 31b, a power storage module 31c, and a power storage module 31d as examples of the plurality of power storage modules. When it is not necessary to distinguish the power storage modules, they will be referred to as the power storage modules 31.

The EMU 30 functions as a host controller in the power storage system 2 and controls sections of the power storage system 2. Furthermore, the EMU 30 functions as a system voltage acquisition unit that obtains a system voltage (voltage Vsys10 to be described later) in a power line PL10 that is measured by a voltage sensor or the like (not shown in figure). The EMU 30 obtains a system voltage in a predetermined cycle, for example.

The EMU 30 and the power storage modules 31 are connected to one another via a communication line SL10. Data and control commands can be exchanged based on a predetermined communication standard between the EMU 30 and the power storage modules 31 via the communication line SL10.

The plurality of power storage modules 31 are connected in parallel to a predetermined power line PL10. The power storage modules 31 are connected to a load 33 via the power line PL10. The contents of the load 33 can be set depending on purposes of the power storage system 2. During operation of the power storage system 2, the voltage Vsys10 as an example of the system voltage is generated in the power line PL10.

Figure 4:
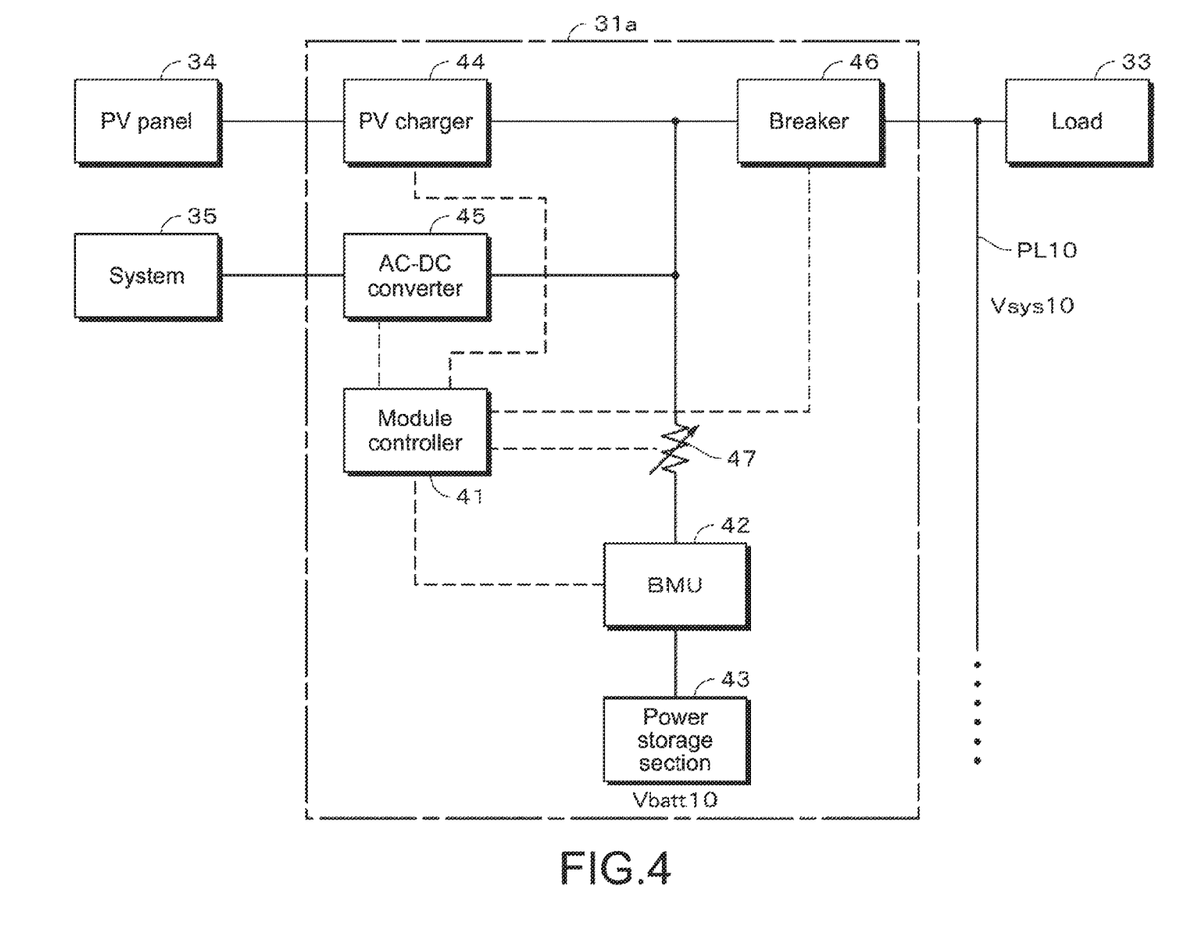
FIG. 4 A diagram for describing a configuration of a power storage module in the embodiment of the present technology.

FIG. 4 is a diagram for describing an example of a configuration of the power storage module in the embodiment of the present technology. FIG. 4 shows the power storage module 31a. The other power storage modules such as the power storage module 31b have the same configuration. Note that, in FIG. 4, paths for power are indicated by solid lines and paths for data and control commands are indicated by dotted lines.

The power storage module 31a is connected to, for example, a PV panel 34, a system power 35, and the load 33. The PV panel 34 is a solar battery module placed on a roof or outdoors, for example. The solar battery module is obtained by connecting a plurality of solar batteries in a panel form and called solar panel. Typically, a plurality of solar battery modules are arranged and thus, a solar battery array is configured.

A power conditioner (not shown in figure) is connected to the PV panel 34. The power conditioner performs controlled called maximum power point tracking (MPPT). This control is a method of constantly tracking a maximum power point following a fluctuation of generated power of the solar battery module. The output of this power conditioner may be connected to a power supply line of an external power system such that the generated power (surplus power) of the solar battery module is sold.

The system power 35 is commercial power, for example. Power (AC power) generated at a power station as a power supplier is supplied to the system power 35 via a transmission network or wiring network (not shown). The load 33 can be set depending on purposes, for example, for a large-scale system as well as an electronic apparatus such as a refrigerator and a television apparatus.

The power storage module 31a includes, for example, a module controller 41, a BMU 42, a power storage section 43, a PV charger 44, an AC-DC 45, a breaker 46, and a variable resistor 47. The PV charger 44 is connected to the PV panel 34 outside the power storage module 31a. The AC-DC converter 45 is connected to the system power 35 outside the power storage module 31a.

The module controller 41 is constituted of a CPU (Central Processing Unit) and the like and controls sections of the power storage module 31a. The module controller 41 may be configured to include a RAM (Random Access Memory) used as a ROM (Read Only Memory), a work memory, or the like that stores programs and the like. The module controller 41 controls, for example, the BMU 42, the PV charger 44, the AC-DC converter 45, the breaker 46, and the variable resistor 47.

The module controller 41 communicates with the EMU 30, and hence the voltage Vsys10 in the power line PL10 is obtained from the EMU 30. Furthermore, the module controller 41 obtains a voltage Vbatt10 of the power storage section 43. The voltage Vbatt10 of the power storage section 43 is measured by, for example, a voltage sensor (not shown in figure).

Note that the module controller 41 continues operating even if the BMU 42 is off, for example. For the power supply of the module controller 41 in this case, power supplied via the PV panel 34 and the PV charger 44 may be used or power supplied via the system power 35 and the AC-DC converter 45 may be used. The power of the power storage section 43 may be supplied only to the module controller 41.

As an example, the current control unit is constituted of the module controller 41 and the variable resistor 47. In this case, the module controller 41 functions as a resistance control unit that sets a resistance value of the variable resistor 47. The module controller 41 suitably sets the resistance value of the variable resistor 47 depending on the voltage Vsys10 and the voltage Vbatt10. By the module controller 41 suitably setting the resistance value of the variable resistor 47, a current that flows between the power storage section 43 and the power line PL10 is controlled.

If a value (e.g., difference value) based on the voltage Vsys10 and the voltage Vbatt10, for example, is larger than a predetermined value, the module controller 41 sets the resistance value of the variable resistor 47 such that the current that flows between the power storage section 43 and the power line PL10 is equal to or smaller than a predetermined current value.

The BMU 42 is connected to the power storage section 43. For example, the BMU 42 is connected to the power storage section 43 via a switching element (not shown in figure) such as an FET (Field Effect Transistor). By the BMU 42 switching on/off this FET, the connection of the power storage section 43 to the system inside or outside the power storage module 31a can be controlled. When the FET is turned on, the power storage section 43 is connected to the system inside the power storage module 31a. In addition, when the breaker 46 is turned on, the power storage section 43 is connected to the system outside the power storage module 31a.

The BMU 42 monitors the state of the power storage section 43 (remaining capacity, battery voltage, battery temperature, and the like) and is operated such that suitable charging/discharging operations are performed. The BMU 42 suitably controls on/off of a charging control switch and a discharging control switch (not shown in figure) formed of an FET or the like and controls charging/discharging of the power storage section 43. The BMU 42 transmits the voltage Vbatt10 of the power storage section 43 to the module controller 41, for example.

The details of the power storage section 43 have already been described and hence overlapping descriptions will be omitted.

The PV charger 44 has a configuration including a DC-DC converter, for example. The PV charger 44 functions to stabilize power generated by the PV panel 34, for example, and convert it into a predetermined voltage. The predetermined voltage is output from the PV charger 44 and supplied to the load 33 or the power storage section 43.

The PV charger 44 is operated by using power supplied from the power storage section 43, for example. An additional power supply for the PV charger 44 may be provided. The PV charger 44 may be operated by power generated by the PV panel 34. That is, if the voltage supplied from the PV panel 34 is above a threshold, the PV charger 44 may be autonomously activated and operated.

The AC-DC converter 45 produces DC power from AC power supplied from the system power 35. The DC power produced by the AC-DC converter 45 is supplied to the load 33 or the power storage section 43.

The breaker 46 brings the power storage section 43 and the power line PL10 into conduction or non-conduction with each other. The on/off of the breaker 46 is controlled by the module controller 41, for example. By turning off the breaker 46, the power storage module 31a can be disconnected from the power storage system 2.

The variable resistor 47 is a resistor capable of varying its resistance value. For example, the current that flows between the power line PL10 and the power storage section 43 can be limited by increasing the resistance value of the variable resistor 47. For example, if there is a fear that the rush current flows, by setting the resistance value of the variable resistor 47 to be larger, the rush current can be reduced. The resistance value of the variable resistor 47 is set under the control of the module controller 41, for example.

Note that if a configuration in which the current that flows between the power line PL10 and the power storage section 43 can be controlled is employed, an element other than the variable resistor may be used. Instead of the variable resistor 47, a current limiting circuit formed of a poly-switch and a plurality of elements may be used.

Note that, at an output stage of the power storage module 31a, a DC-AC invertor may be provided. The DC-AC invertor produces, from DC power output from the power storage module 31a, AC power having the same level and frequency as the commercial power. The AC power produced by the DC-AC invertor may be supplied to the load 33.

Example of Power Flow

An example of power flow in the power storage module 31a will be described. In the power storage module 31a, the power storage section 43 can be charged based on DC power supplied from the PV panel 34. That is, a direct-current voltage supplied from the PV panel 34 is converted into a suitable direct-current voltage by the PV charger 44. The direct-current voltage produced by the PV charger 44 is supplied to the power storage section 43 and the power storage section 43 is charged.

In addition, in the power storage module 31a, the power storage section 43 can be charged based on the AC power supplied from the system power 35. The alternate-current voltage supplied from the system power 35 is converted into a direct-current voltage by the AC-DC converter 45. The direct-current voltage is supplied to the power storage section 43 and the power storage section 43 is charged. Note that, for charging the power storage section 43, for example, charging according to a constant current (CC)-constant voltage (CV) method is performed. When the power storage section 43 is charged, initial charging of a low current may be performed.

The power storage module 31a is capable of supplying the power supplied from the PV panel 34 to the load 33. The direct-current voltage supplied from the PV panel 34 is converted into a predetermined voltage by the PV charger 44 and DC power is produced. The DC power produced by the PV charger 44 is supplied to the load 33.

The power storage module 31a is capable of supplying the AC power supplied from the system power 35 to the load 33. The AC power supplied from the system power 35 is supplied to the AC-DC converter 45. The AC-DC converter 45 produces DC power from the AC power and outputs it. The DC power output from the AC-DC converter 45 is supplied to the load 33.

The power storage module 31a is capable of supplying power due to discharging of the power storage section 43 to the load 33. The DC power due to the discharging of the power storage section 43 is supplied to the load 33 via the BMU 42, the variable resistor 47, and the breaker 46. In addition, for example, the power storage section 43 may be charged with the power supplied from the PV panel 34 while supplying the power supplied from the system power 35 to the load 33.

Example of Operation of Power Storage Module

Figure 5:
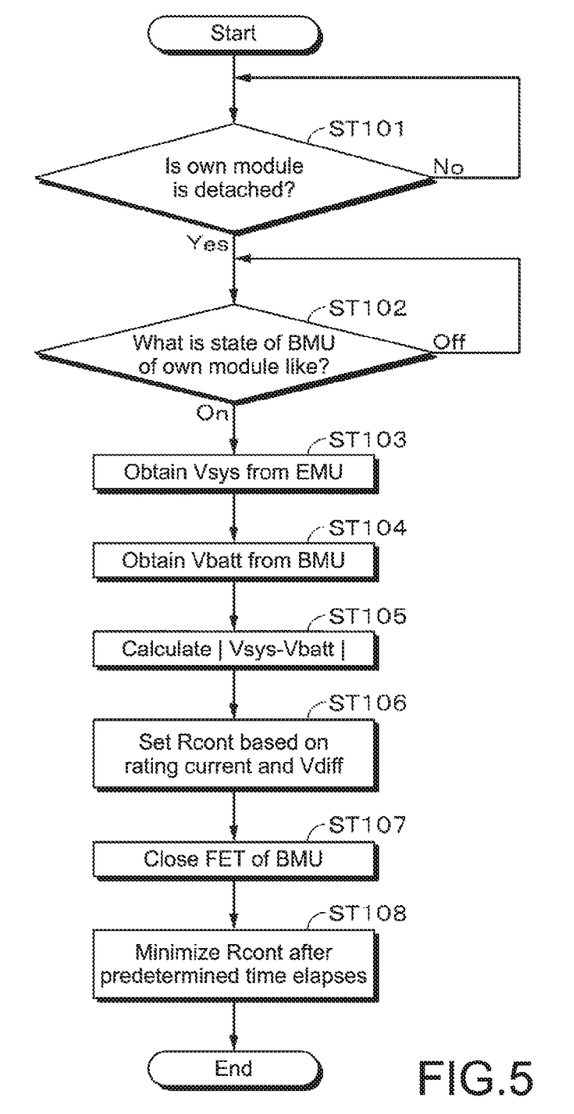
FIG. 5 A flowchart for describing an example of a flow of processing of the power storage module in the embodiment of the present technology.
Figure 6:
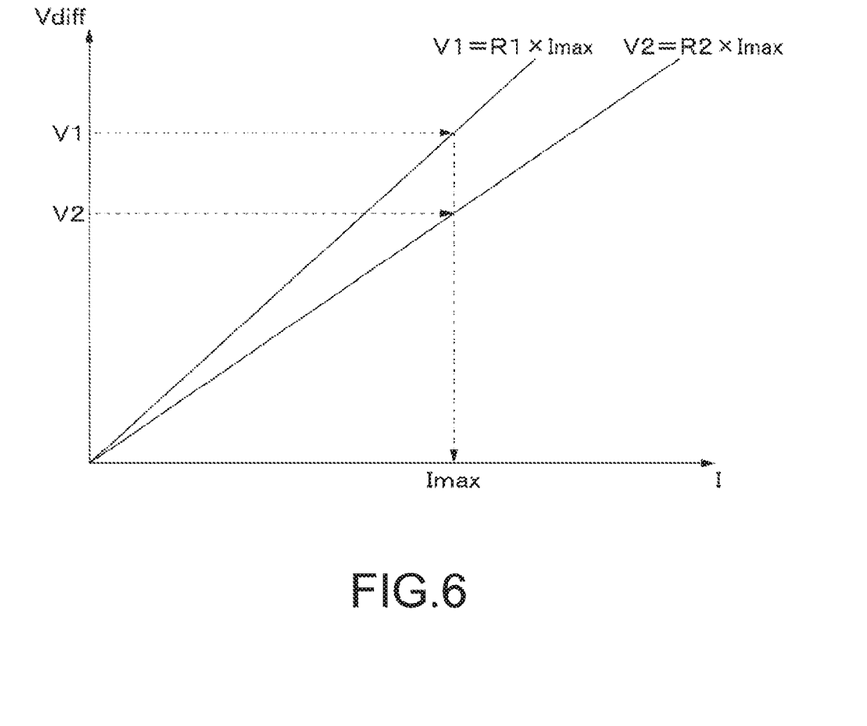
FIG. 6 A diagram for describing an example of processing of setting a resistance value of a variable resistor in the embodiment of the present technology.

Referring to FIGS. 5 and 6, an example of an operation of the power storage module 31a will be described. Note that the other power storage modules such as the power storage module 31b are operated in the same manner.

FIG. 5 is a flowchart for describing the example of the operation of the power storage module 31a. Note that processing described below is performed under the control of the module controller 41 unless otherwise stated.

In Step ST101, the module controller 41 checks the state of the breaker 46 and determines whether or not its own module (in this example, power storage module 31a) is connected to the power line PL10 of the power storage system 2. If the power storage module 31a is connected to the power line PL10, the processing returns to Step ST101. Then, the determination of Step ST101 is periodically repeated. If the power storage module 31a is not connected to the power line PL10, the processing proceeds to Step ST102.

In Step ST102, the module controller 41 checks on/off of the BMU 42 of its own system. If the BMU 42 is off, the module controller 41 determines that the power storage module 31a is under maintenance or the like. Then, the processing returns to Step ST102 and the determination of Step ST102 is repeated. If the BMU 42 is on, the processing proceeds to Step ST103.

For example, before the power storage module 31a is connected to the power line PL10, processing of obtaining the voltage Vsys10 and the voltage Vbatt10 is performed. That is, in Step ST103, the module controller 41 communicates with the EMU 10 and obtains the voltage (voltage Vsys10) of the system from the EMU 10. Then, the processing proceeds to Step ST104.

In Step ST104, the module controller 41 communicates with the BMU 42 and obtains the voltage (voltage Vbatt10) of the power storage section 43 from the BMU 42. In the module controller 41, the voltage Vsys10 and the voltage Vbatt10 are input. Then, the processing proceeds to Step ST105.

In Step ST105, the module controller 41 calculates Vdiff that is an absolute value of a difference between the voltage Vsys10 and the voltage Vbatt10 (|voltage Vsys10−voltage Vbatt10|). Then, the processing proceeds to Step ST106.

In Step ST106, a resistance value Rcont of the variable resistor 47 is set based on a rating current of the power storage module 31a and Vdiff. Here, assuming that the vertical axis indicates Vdiff and the horizontal axis indicates the current in FIG. 6, based on Ohm's law, Vdiff is a linear function with the resistance value Rcont being an inclination.

For example, assuming that the rating current is indicated by Imax and Vdiff is indicated by V1, a value larger than R1 is selected as the resistance value Rcont based on FIG. 6. As a specific example, if V1 is 50 V and Imax is 20 A, the resistance value of R1 is set to a value equal to or larger than 2.5Ω (ohm).

For example, assuming that the rating current is indicated by Imax and Vdiff is indicated by V2, a value larger than R2 is selected as the resistance value Rcont based on FIG. 6. As a specific example, if V2 is 40 V and Imax is 20 A, the resistance value of R2 is set to a value equal to or larger than 2.0Ω (ohm). After the resistance value Rcont of the variable resistor 47 is determined, the processing proceeds to Step ST107.

In Step ST107, the module controller 41 instructs the BMU 42 to perform control to connect the power storage section 43 to the power storage system 2. In response to this instruction, the BMU 42 turns on an FET switch, for example. With this, preparation to connect the power storage section 43 to the power storage system 2 is performed.

In addition, the module controller 41 turns on the breaker 46 and connects the power storage module 31a to the power storage system 2. The resistance value Rcont of the variable resistor 47 is connected to a suitable value, and hence it is possible to prevent a rush current (e.g., current exceeding rating) from flowing through the power storage section 43 or the load 33. That is, by setting the resistance value Rcont to the suitable value, the current that flows between the power storage section 43 and the power line PL10 can be set to be equal to or smaller than the predetermined current value (e.g., equal to or smaller than rating current).

Note that, after the power storage module 31a is connected and a predetermined time elapses, the difference between the voltage Vsys10 and the voltage Vbatt10 decreases and the entire power storage system 2 transitions to a steady state. Although the predetermined time is a time depending on an output voltage and the like of the power storage module 31a, the predetermined time is set to about one second as an example. In the embodiment, the processing of Step ST108 is further performed.

In Step ST108, the module controller 41 reduces the resistance value Rcont after the predetermined time elapses. For example, the module controller 41 minimizes the resistance value Rcont after a predetermined time elapses. With this, when the power storage module 31a performs normal charging/discharging, it is possible to prevent a loss such as voltage drop due to the variable resistor 47 from being caused.

As described above, in the embodiment, the current that flows between the power line and the power storage section can be controlled. In addition, according to the embodiment, the suitable resistance value of the variable resistor is automatically set, and hence it is possible to prevent the current exceeding the rating from flowing when the power storage module is connected to the system. The resistance value of the variable resistor is set instantaneously, and hence it is possible to greatly shorten the time required to connect the power storage module to the system. In addition, the connection of the power storage module to the system is automatic, and hence it is possible to prevent the rush current from flowing due to human error or the like.

2. Modified Example

Hereinabove, the embodiment of the present technology will be specifically described, the present technology is not limited to the above-mentioned embodiment and can be variously changed based on the technical ideas of the present technology.

Figure 7:
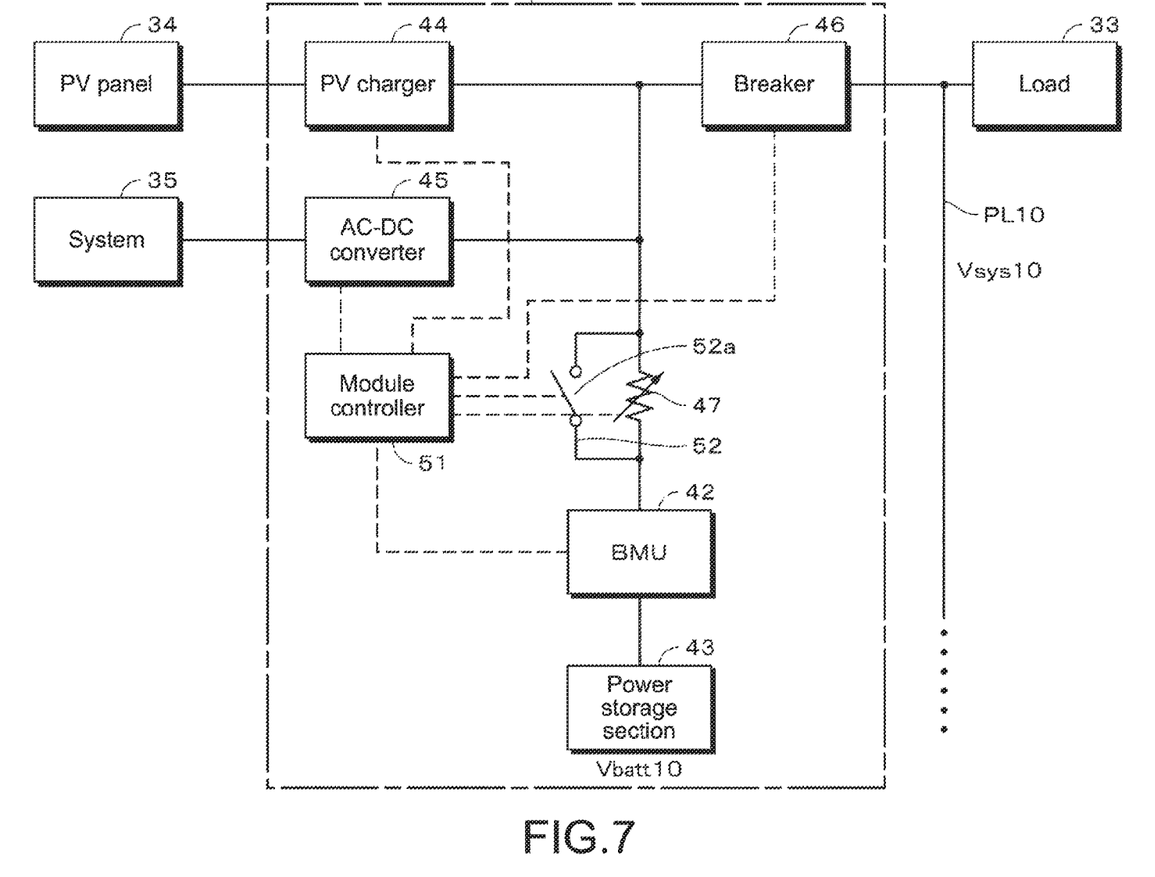
FIG. 7 A diagram for describing a configuration of a power storage module in a modified example of the present technology.

FIG. 7 is a block diagram for describing a modified example of the power storage module. Note that, in FIG. 7, the same components as the power storage module 31a are denoted by the same symbols and overlapping descriptions are omitted.

A power storage module 50 in the modified example includes a bypass circuit 52 that bypasses a module controller 51 and a variable resistor 47. The bypass circuit 52 includes a switch 52a connected in parallel to the variable resistor 47, for example.

An example of an operation of the power storage module 50 will be described. The module controller 51 of the power storage module 50 suitably sets a resistance value of the variable resistor 47 as in the module controller 41 of the power storage module 31a. With this, it is possible to reduce a rush current that can be generated when the power storage module 50 is connected to a power line PL10. Note that the switch 52a of the bypass circuit 52 is off when the power storage module 50 is connected to the power line PL10.

After the power storage module 50 is connected to the power line PL10 and a predetermined time elapses, the module controller 51 turns on the switch 52a. By turning on the switch 52a, a path for the current is changed from the circuit including the variable resistor 47 to the bypass circuit 52. Although it is difficult to precisely set the resistance value of the variable resistor 47 to zero, the resistor is not connected to the bypass circuit 52, and hence it is possible to cause a loss due to the resistor when the power storage module 50 performs normal charging/discharging.

Other than the above-mentioned modified example, the present technology can be variously changed unless technical contradiction occurs. For example, if the absolute value of the difference between the voltage Vsys and the voltage Vbatt is smaller than the predetermined value, the rush current is unlikely to flow, and hence the resistance value of the variable resistor may be minimized.

In the above-mentioned embodiment, the resistance value of the variable resistor is calculated based on the absolute value of the difference between the voltage Vsys and the voltage Vbatt. Instead of this, a table in which resistance values each corresponding to an absolute value of a difference between a voltage Vsys and a voltage Vbatt are described may be stored in the ROM or the like. Then, the module controller may read out a resistance value corresponding to an absolute value of a difference between a voltage Vsys and a voltage Vbatt from this table. The table in which the resistance values are described may be input into the power storage modules via a network or the like.

By directly connecting a plurality of power storage modules, a power storage module group may be formed. A plurality of power storage module groups may be connected in parallel to a power line. The power storage modules being connected in series and parallel to the power line is also included in the power storage modules being connected in parallel to the power line in the scope of claims.

The present technology is not limited to the apparatus and can be realized as a method, a system, a program, or the like. The configurations and processing in the embodiment and the like can be appropriately combined unless technical contradiction occurs. The order of the processes in the exemplified flow of processing can be appropriately changed unless technical contradiction occurs.

The present technology can also take the following configurations.

(1) A power storage system, including:
a plurality of power storage modules that are connected in parallel to a power line; and
a system voltage acquisition unit that obtains a system voltage in the power line, the power storage module including
a power storage section that is formed of one or more storage batteries, and
a current control unit that controls a current that flows between the power storage section and the power line, the current control unit controlling, according to the system voltage and a voltage of the power storage section, the current that flows between the power storage section and the power line.

(2) The power storage system according to (1), in which
the current control unit includes
at least one variable resistor, and
a resistance control unit that sets a resistance value of the variable resistor.

(3) The power storage system according to (2), in which
the resistance control unit sets the resistance value such that the current that flows between the power storage section and the power line is equal to or smaller than a predetermined current value if a value obtained based on the system voltage and the voltage of the power storage section is larger than a predetermined value.

(4) The power storage system according to (2) or (3), in which
before at least one power storage module is connected to the power line, the system voltage and a voltage of a power storage section of the power storage module are obtained, and
the resistance control unit sets the resistance value according to the system voltage and the voltage of the power storage section.

(5) The power storage system according to any one of (2) to (4), in which
after at least one power storage module is connected to the power line and a predetermined time elapses, the resistance control unit of the power storage module reduces the resistance value.

(6) The power storage system according to (5), in which
after at least one power storage module is connected to the power line and a predetermined time elapses, the resistance control unit of the power storage module minimizes the resistance value.

(7) The power storage system according to any one of (2) to (4), in which
the power storage module includes a bypass circuit that bypasses the variable resistor, and
after at least one power storage module is connected to the power line and a predetermined time elapses, the current control unit sets a path for the current to the bypass circuit.

(8) The power storage system according to any one of (2) to (7), in which
the power storage module includes a breaker that brings the power storage section and the power line into conduction or non-conduction with each other, and
after the resistance control unit sets the resistance value, the breaker is switched from the non-conduction to the conduction.

(9) The power storage system according to (2) to (8), in which the resistance control unit sets the resistance value according to an absolute value of a difference between the system voltage and the voltage of the power storage section.

(10) A power storage module that is connectable and disconnectable to/from a predetermined power line, including:

a power storage section that is formed of one or more storage batteries; and a current control unit that controls a current that flows between the power storage section and the power line, the current control unit controlling, according to a system voltage in the power line and a voltage of the power storage section, the current that flows between the power storage section and the power line.

(11) A control method for a power storage module, including:

obtaining a system voltage in a power line to/from which the power storage module is connectable and disconnectable; and controlling a current that flows between the power storage section and the power line according to the obtained system voltage and a voltage of a power storage section that is formed of one or more storage batteries.

3. Application Examples

Application examples of the present technology will be described. Note that the contents of the present technology are not limited to the application example described below.

"Power Storage Apparatus in House as Application Example"

Figure 8:
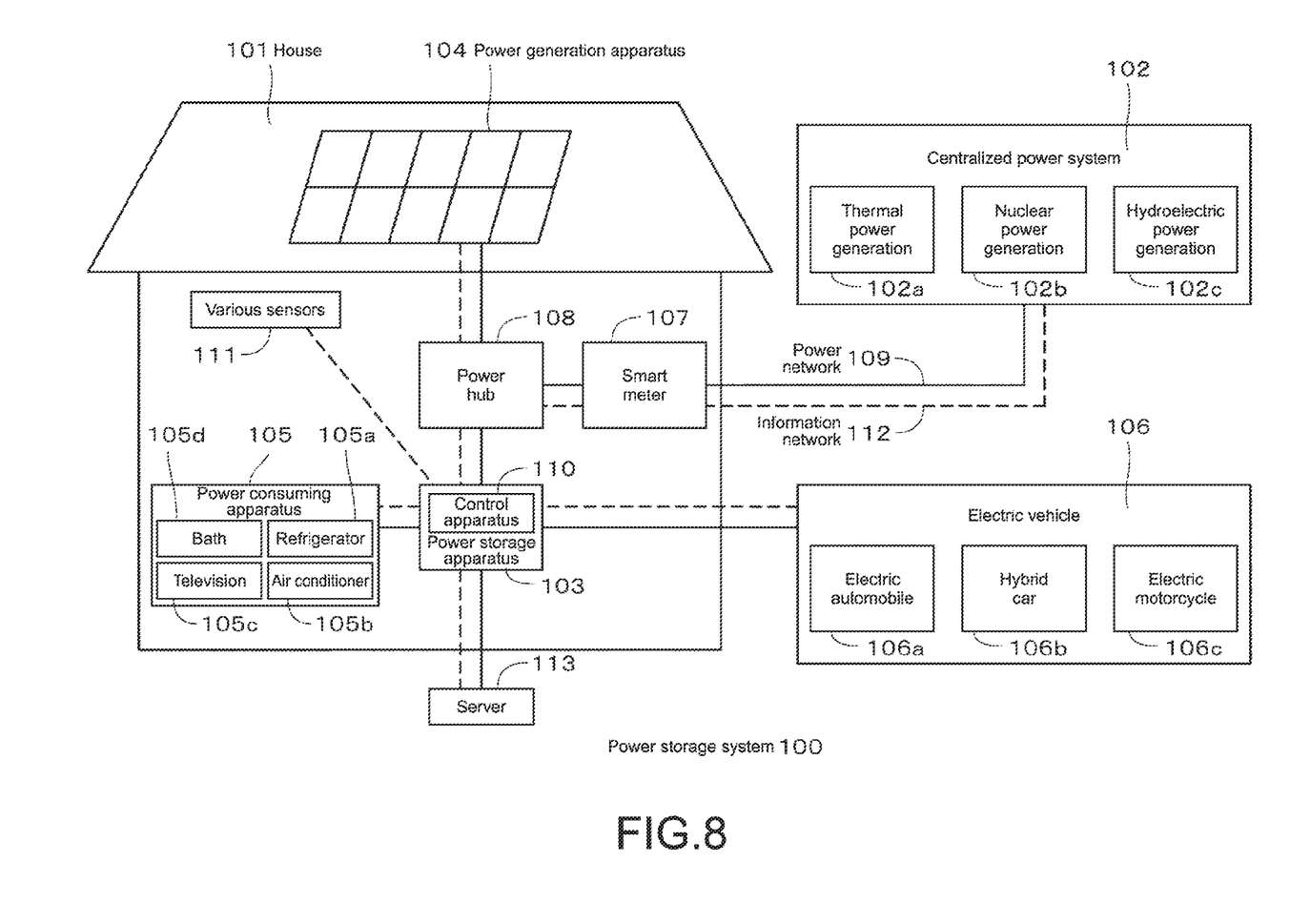
FIG. 8 A diagram for describing an application example of the present technology.

An example in which the present technology is applied to a power storage apparatus for a house will be described referring to FIG. 8. For example, in a power storage apparatus 100 for a house 101, power is supplied from a centralized power system 102 such as a thermal power generation 102a, a nuclear power generation 102b, and a hydroelectric power generation 102c to a power storage apparatus 103 via a power network 109, an information network 112, a smart meter 107, a power hub 108, or the like. Along with this, power is supplied from an independent power supply such as a private power generation apparatus 104 to the power storage apparatus 103. The power supplied to the power storage apparatus 103 is stored. Using the power storage apparatus 103, the power to be used in the house 101 is supplied. It is not limited to the house 101, a similar power storage apparatus can also be used in a building.

In the house 101, provided are the private power generation apparatus 104, a power consuming apparatus 105, the power storage apparatus 103, a control apparatus 110 that controls the respective apparatuses, the smart meter 107, and sensors 111 that obtain various types of information. The respective apparatuses are connected through the power network 109 and the information network 112. A solar battery, a fuel battery, or the like is used as the private power generation apparatus 104. The generated power is supplied to the power consuming apparatus 105 and/or the power storage apparatus 103. The power consuming apparatus 105 is a refrigerator 105a, an air conditioner apparatus 105b, a television receiver 105c, a bath 105d, or the like. In addition, the power consuming apparatus 105 includes an electric vehicle 106. The electric vehicle 106 is an electric automobile 106a, a hybrid car 106b, or an electric motorcycle 106c.

The power storage apparatus 103 is constituted of a secondary battery or a capacitor. For example, it is constituted of a lithium-ion secondary battery. The above-mentioned power storage module 31 or the power storage module 50 is applicable as the power storage apparatus 103. The lithium-ion secondary battery may be a stationary type or may be used in the electric vehicle 106. The smart meter 107 functions to measure a commercial-power consumption and transmit the measured consumption to a power company. Regarding the power network 109, one or more of a direct-current power supply, an alternate-current power supply, and a non-contact power supply may be combined.

The various sensors 111 are, for example, a person sensor, an illuminance sensor, an object detection sensor, a power consumption sensor, a vibration sensor, a contact sensor, a temperature sensor, and an infrared ray sensor. Information obtained by the various sensors 111 is transmitted to the control apparatus 110. From the information from the sensors 111, a weather state, a person state, and the like can be known and the power consuming apparatus 105 can be automatically controlled to minimize the energy consumption. In addition, the control apparatus 110 is capable of transmitting information on the house 101 to the external power company or the like via the Internet.

Processing such as branching of the power line and DC-AC conversion is performed by the power hub 108. As a communication method of the information network 112 connected to the control apparatus 110, there are a method of using a communication interface such as UART (Universal Asynchronous Receiver-Transmitter) and a method of using a sensor network according to wireless communication standards such as Bluetooth™, ZigBee™, and Wi-Fi™.

The Bluetooth system is applied to multimedia communication and can perform one-to-many connection communication. The ZigBee uses a physical layer of IEEE (Institute of Electrical and Electronics Engineers) 802.15.4. The IEEE802.15.4 is a name of a short-distance wireless network standard called PAN (Personal Area Network) or W (Wireless) PAN.

The control apparatus 110 is connected to an external server 113. This server 113 may be managed by any of the house 101, the power company, and a service provider. Information transmitted and received by the server 113 are, for example, power consumption information, life pattern information, power charges, weather information, disaster information, and information on power transaction. Such information may be transmitted and received from the power consuming apparatus (e.g., television receiver) inside the house. Alternatively, the information may be transmitted and received from an apparatus (e.g., cellular phone) outside the house. The information may be displayed by a device having a display function, for example, the television receiver, the cellular phone, or PDA (Personal Digital Assistants).

The control apparatus 110 that controls the respective sections is constituted of a CPU, a RAM, a ROM, and the like and housed in the power storage apparatus 103 in this example. The control apparatus 110 is connected to the power storage apparatus 103, the private power generation apparatus 104, the power consuming apparatus 105, the various sensors 111, and the server 113 via the information network 112. The control apparatus 110 functions to adjust the commercial-power consumption and a power generation amount, for example. Note that it also functions to perform power transaction in a power market, for example.

As described above, regarding the power, the generated power of the centralized power system 102 such as the thermal power generation 102a, the nuclear power generation 102b, and the hydroelectric power generation 102c as well as the generated power of the private power generation apparatus 104 (solar power generation, wind power generation) can be stored in the power storage apparatus 103. Therefore, even if the generated power of the private power generation apparatus 104 fluctuates, it is possible to perform control to make an externally transmitted power amount constant or discharge a required amount of power. For example, the following usage is possible. Specifically, power obtained by solar power generation is stored in the power storage apparatus 103 and inexpensive midnight power is stored in the power storage apparatus 103 during night time and the power stored by the power storage apparatus 103 is discharged and used during daytime when power charges are expensive.

Although, in the above example, the control apparatus 110 is housed in the power storage apparatus 103, it may be housed in the smart meter 107 or may be configured without the housing. In addition, the power storage apparatus 100 may be used for a plurality of households in an apartment house or may be used for a plurality of detached houses.

"Power Storage Apparatus in Vehicle as Application Example"

Figure 9:
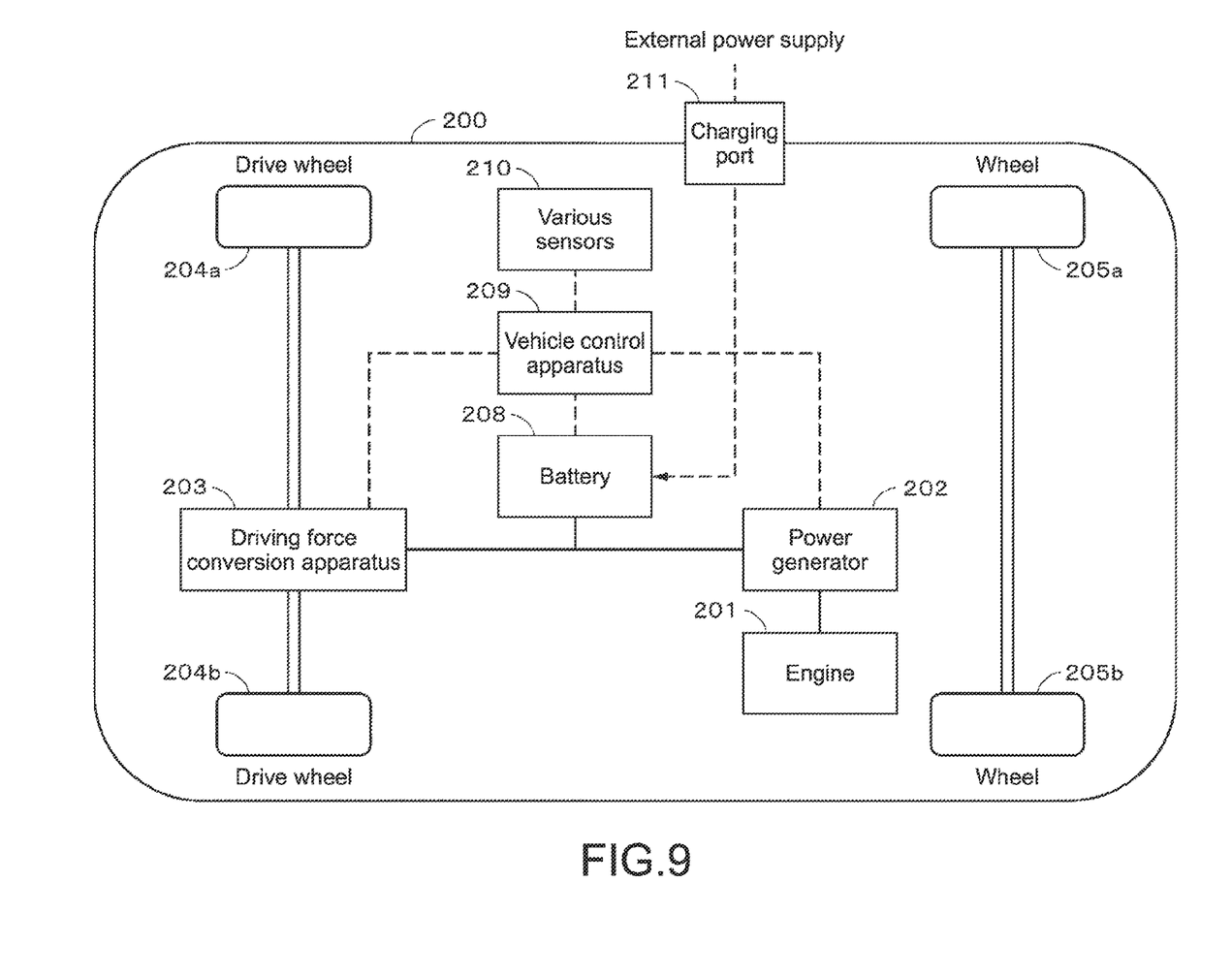
FIG. 9 A diagram for describing an application example of the present technology.

An example in which the present technology is applied to a power storage apparatus for a vehicle will be described with reference to FIG. 9. FIG. 9 schematically shows an example of a configuration of a hybrid vehicle employing a series hybrid system to which the present technology is applied. The series hybrid system is an automobile that runs by an electric power/driving force conversion apparatus using power generated by a power generator driven by an engine or the power stored in a battery.

In this hybrid vehicle 200, an engine 201, a power generator 202, an electric power/driving force conversion apparatus 203, a drive wheel 204a, a drive wheel 204b, a wheel 205a, a wheel 205b, a battery 208, a vehicle control apparatus 209, various sensors 210, and a charging port 211 are installed.

The hybrid vehicle 200 runs by using the electric power/driving force conversion apparatus 203 as a power source. An example of the electric power/driving force conversion apparatus 203 is a motor. The electric power/driving force conversion apparatus 203 is activated by power of the battery 208 and rotational force of this electric power/driving force conversion apparatus 203 is transmitted to the drive wheels 204a and 204b. Note that, by using direct current-alternate current (DC-AC) or inverse conversion (AC-DC conversion) at a necessary point, the electric power/driving force conversion apparatus 203 is applicable to both of an alternate-current motor and a direct-current motor. The various sensors 210 control the r.p.m. of the engine via the vehicle control apparatus 209 and control throttle valve opening (throttle opening) (not shown). The various sensors 210 include a speed sensor, an acceleration sensor, an engine r.p.m. sensor, and the like.

The rotational force of the engine 201 is transmitted to the power generator 202 and power generated by the power generator 202 can be stored in the battery 208 by the rotational force.

When the hybrid vehicle is decelerated by a braking mechanism (not shown), a resistance when the speed is reduced is added to the electric power/driving force conversion apparatus 203 as the rotational force. Then, regenerative power generated from this rotational force by the electric power/driving force conversion apparatus 203 is stored in the battery 208.

By the battery 208 being connected to the power supply outside the hybrid vehicle, it is also possible to receive a power supplied from an external power supply thereof with the charging port 211 being an input port and accumulate the received power. For example, the power storage modules 31 or the power storage module 50 can be applied as the battery 208.

Although not shown in the figure, an information processing apparatus that performs information processing relating to vehicle control based on information on a secondary battery may also be provided. As this information processing apparatus, for example, information processing apparatus or the like that displays a remaining capacity of a battery based on information on the remaining capacity of the battery.

Note that the series hybrid vehicle that runs by the motor using the power generated by the power generator driven by the engine or the power stored in the battery has been described as an example. However, the present technology is effectively applicable also to a parallel hybrid vehicle that sets both outputs of the engine and the motor as driving sources and appropriately switches and uses three modes of running only by the engine, running only by the motor, and running by the engine and the motor. In addition, the present technology is effectively applicable also to a so-called electric vehicle that is driven only by a driving motor without the engine for running.

DESCRIPTION OF SYMBOLS 2 power storage system
30 EMU
31, 50 power storage module
33 load
41, 51 module controller
42 BMU
43 power storage section
46 breaker
47 variable resistor
52 bypass circuit
PL10 power line
Vsys system voltage
Vbatt voltage of power storage section

The invention claimed is:
1. A power storage system, comprising:
a plurality of power storage modules that are connected in parallel to a power line; and
a system voltage acquisition unit that obtains a system voltage in the power line,
a power storage module of the plurality of power storage modules including:
a power storage section that is formed of one or more storage batteries, and
a current control unit that comprises at least one variable resistor and a resistance control unit,
wherein the resistance control unit sets a resistance value of the at least one variable resistor based on a voltage difference that exceeds a threshold voltage,
wherein the voltage difference is between a voltage of the power storage section and the system voltage, and
wherein the current control unit controls a current that flows between the power storage section and the power line according to the set resistance value.
2. The power storage system according to claim 1, wherein the resistance control unit sets the resistance value such that the current that flows between the power storage section and the power line is equal to or smaller than a predetermined current value if a value obtained based on the system voltage and the voltage of the power storage section is larger than a predetermined value.

3. The power storage system according to claim 1, wherein
before at least one power storage module of the plurality of power storage modules is connected to the power line, the system voltage and the voltage of the power storage section of the power storage module are obtained, and
the resistance control unit sets the resistance value according to the system voltage and the voltage of the power storage section.

4. The power storage system according to claim 1, wherein
after at least one power storage module of the plurality of power storage modules is connected to the power line and a predetermined first time elapses, the resistance control unit reduces the resistance value.

5. The power storage system according to claim 4, wherein
after at least one power storage module of the plurality of power storage modules is connected to the power line and a predetermined second time elapses, the resistance control unit minimizes the resistance value.

6. The power storage system according to claim 1, wherein
at least one power storage module of the plurality of power storage modules includes a bypass circuit that bypasses the at least one variable resistor, and
after at least one power storage module of the plurality of power storage modules is connected to the power line and a predetermined time elapses, the current control unit sets a path for the current to the bypass circuit.

7. The power storage system according to claim 1, wherein
at least one power storage module of the plurality of power storage modules includes a breaker that brings the power storage section and the power line into conduction or non-conduction with each other, and
after the resistance control unit sets the resistance value, the breaker is switched from the non-conduction to the conduction.

8. The power storage system according to claim 1, wherein
the resistance control unit sets the resistance value according to an absolute value of the voltage difference between the system voltage and the voltage of the power storage section.

9. A power storage module that is connectable and disconnectable to/from a predetermined power line, comprising:
a power storage section that is formed of one or more storage batteries; and
a current control unit that comprises at least one variable resistor and a resistance control unit,
wherein the resistance control unit sets a resistance value of the at least one variable resistor based on a voltage difference that exceeds a threshold voltage,
wherein the voltage difference is between a voltage of the power storage section and a system voltage in the power line, and
wherein the current control unit controls a current that flows between the power storage section and the power line, according to the set resistance value.

10. A control method for a power storage module, comprising:
obtaining a system voltage in a power line to/from which the power storage module is connectable and disconnectable;
setting a resistance value of at least one variable resistor, based on a voltage difference that exceeds a threshold voltage, wherein the voltage difference is between a voltage of a power storage section of the power storage module and the system voltage; and
controlling a current that flows between the power storage section of the power storage module and the power line, based on the set resistance value of the at least one variable resistor.

* * * * *